US005380092A

United States Patent [19]

Alain

[11] Patent Number: 5,380,092

[45] Date of Patent: Jan. 10, 1995

[54] FLUID TEMPERATURE INDICATOR

[76] Inventor: George Alain, #2, 4035 Ogden Rd., Calgary, Alberta, Canada, T2G 4N9

[21] Appl. No.: 132,791

[22] Filed: Oct. 7, 1993

[51] Int. Cl.[6] ........................ G01K 11/06; G01K 1/14; G01K 13/02

[52] U.S. Cl. .................................... 374/160; 374/141; 374/148; 116/217

[58] Field of Search ............... 374/160, 208, 141, 147, 374/148; 116/217, 218

[56] References Cited

U.S. PATENT DOCUMENTS

| | | | |
|---|---|---|---|
| 1,357,302 | 11/1920 | Schiefer | 116/217 |
| 1,374,857 | 4/1921 | Linebarger | 374/141 |
| 2,829,185 | 4/1958 | Macatician et al. | 374/141 |
| 4,016,762 | 4/1977 | Payne | 116/217 |
| 4,325,254 | 4/1982 | Svacina et al. | 374/141 |
| 4,818,119 | 4/1989 | Busch et al. | 374/208 |
| 4,904,091 | 2/1990 | Ward | 374/208 |

OTHER PUBLICATIONS

"Heat Tabs" Product No. 1193, Hastings Catalog #320, p. 81 (no date).

*Primary Examiner*—Diego F. F. Gutierrez
*Attorney, Agent, or Firm*—Macro-Search Corp.

[57] ABSTRACT

An apparatus is provided for indicating if the temperature of a fluid within a machine has surpassed a critical temperature. An integrally formed support of a rigid material able to withstand the critical temperature includes a head and a cavity formed within the head. The head provides a hexagonal nut such that a standard socket wrench or other wrench may be used to engage and rotationally drive the head of the device. An engagement shaft extends from the head and provides an external machine screw thread that enables engagement of the shaft within a complimentary threaded hole in the machine. The shaft further includes an axial bore that extends from a distal end of the shaft, through the shaft, and terminates adjacent to the cavity within the head. A temperature indicator is made of a material having a melting temperature equal to the critical temperature and is bonded within the cavity such that the support means and the indicator means are in good thermal contact. As such, when fitted into the machine, the indicator is maintained at the temperature of the fluid. If the fluid temperature exceeds the critical temperature, the indicator will melt, thereby indicating to a person looking into the cavity that the fluid in the machine had surpassed at least the critical temperature.

6 Claims, 2 Drawing Sheets

FLUID TEMPERATURE INDICATOR

FIELD OF THE INVENTION

This invention relates generally to mechanical temperature indicator devices, and, more particularly, is directed towards a device for indicating if a fluid within a machine has exceeded a critical temperature.

BACKGROUND OF THE INVENTION

Warranties for machines, such as engines, typically become void if it can be shown that the operator of such a machine was negligent in its operation. For example, combustion engines require a minimum level of circulating lubricating oil, or the like, flowing through the engine for the engine to operate at a proper temperature. In the event that the engine is low on oil, the engine components can overheat to the point of causing irreversible damage. Since such an event is the result of neglect on behalf of the operator, and not the fault of engine manufacturers and service personnel who warrant such engines, warrantors would like to prove neglect was the cause of the damage to the engine in such cases. Clearly if neglect can be proven, fraudulent warranty claims can be significantly reduced.

Hastings Co. markets a product called "Heat Tabs" that comprises a disk that is adhered to the engine. The disk includes a heat sensitive material that melts upon reaching a certain critical temperature, such as 250° F., thereby providing visual evidence that the temperature of the engine reached at least 250° F. With such a device installed upon the engine, a person may observe the heat sensitive material to see if it has melted. One drawback to such a device, however, is that it must be adhered to the engine with an adhesive, and is therefore prone to being removed either inadvertently or purposefully. Removal of such a device does not disable the engine. Further, such a device indicates only if the exterior surface of the engine has exceeded the critical temperature. The fluid inside the engine may have reached much higher temperatures. Consequently, in instances where the fluid inside the engine has reached the critical temperature, but the outside surface of the engine has not, such prior art devices will not indicate that the engine temperature reached the critical temperature.

Clearly, then, there is a need for a temperature indicator that indicates if the temperature of fluid within an engine has surpassed a critical temperature. Such a needed device, if removed from the engine, would quickly disable the engine. Further, such a needed device could readily be used in conjunction with a tamper-proof seal that indicates if the device has been removed from the engine. Such a needed invention would not be easily removed from the engine. The present invention fulfills these needs and provides further related advantages.

SUMMARY OF THE INVENTION

The present invention is a device for indicating if the temperature of a fluid within a machine has surpassed a critical temperature. An integrally formed support means of a rigid material able to withstand the critical temperature includes a head and a cavity formed within the head. The head provides a hexagonal nut such that a standard socket wrench or other wrench may be used to engage and rotationally drive the head of the device.

An engagement shaft extends from the head and provides an external machine screw thread that enables engagement of the shaft within a complimentary threaded hole in the machine. The shaft further includes an axial bore that extends from a distal end of the shaft, through the shaft, and terminates near the cavity within the head. Further, the shaft preferably includes at least two contiguous portions formed consecutively therealong. Each one of the portions that is closer to the distal end of the shaft has a smaller diameter than each immediately previous portion. As such, the shaft may be engaged with apertures of various sizes.

A temperature indicator is made of a material having a melting temperature equal to the critical temperature and is bonded within the cavity such that the support means and the indicator are in good thermal contact. As such, when fitted into the machine, the indicator of the device is maintained at the temperature of the fluid within the machine. If the fluid temperature exceeds the critical temperature, the indicator will melt, thereby indicating to a person looking into the cavity that the fluid in the machine had surpassed at least the critical temperature.

The present invention indicates if the temperature of fluid within an engine has surpassed a critical temperature, not just if the surface temperature of the engine has exceeded the critical temperature. The present device, if removed from the engine, will quickly disable the engine. Further, the present device can readily be used in conjunction with a tamper-proof seal that indicates if the device has been removed from the engine. The present invention is not easily removed from the engine, and is not prone to loosening during use. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
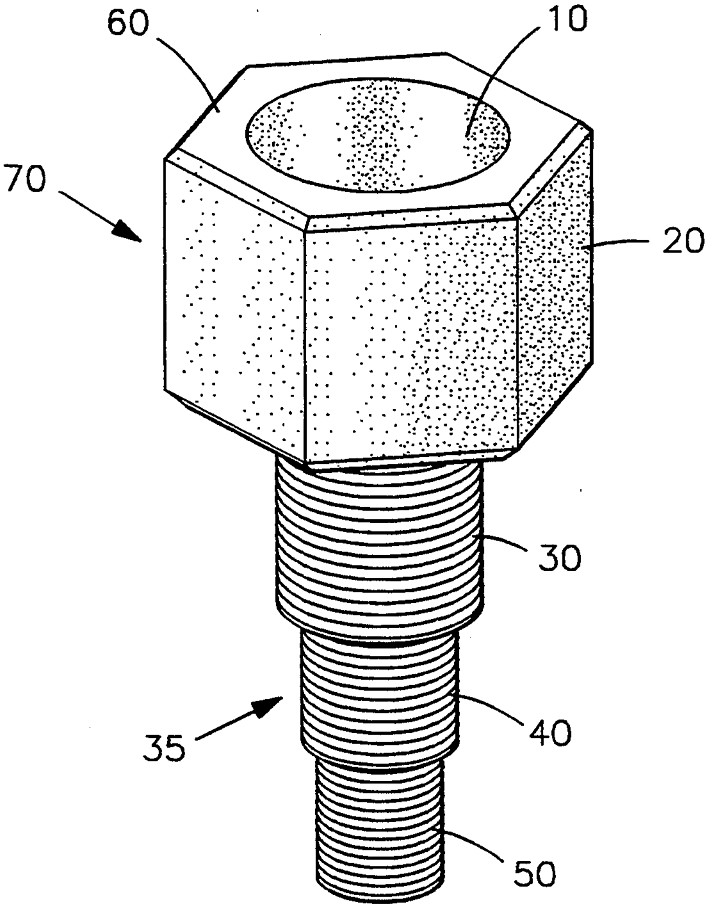
FIG. 1 is a perspective view of the invention, illustrating a head and an engagement shaft of the invention.
Figure 4:
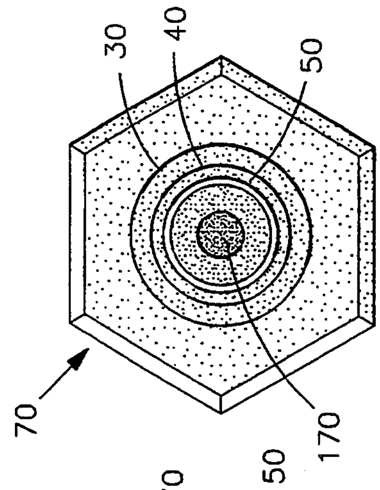
FIG. 4 is a bottom plan view of the invention, illustrating the axial bore of the invention.
Figure 3:
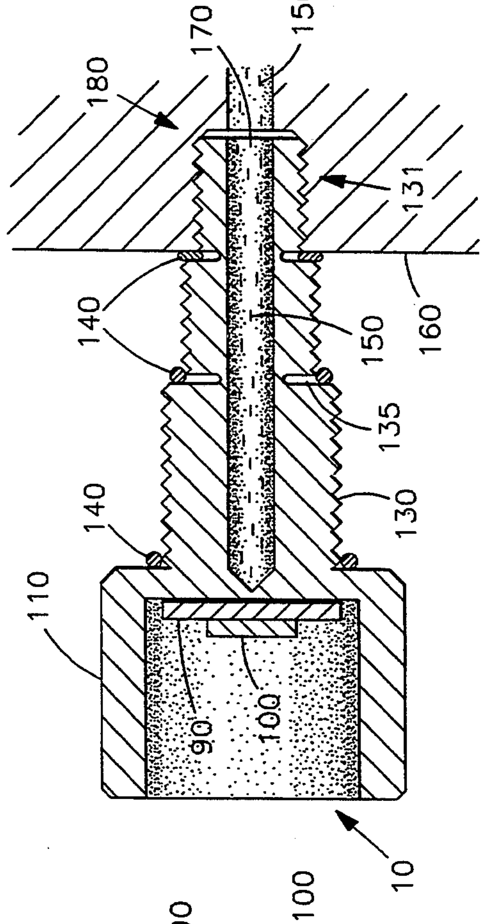
FIG. 3 is a cross-sectional view of the invention, taken along lines 3—3 of FIG. 2, and illustrating an axial bore of the invention in fluid communication with a machine.
Figure 2:
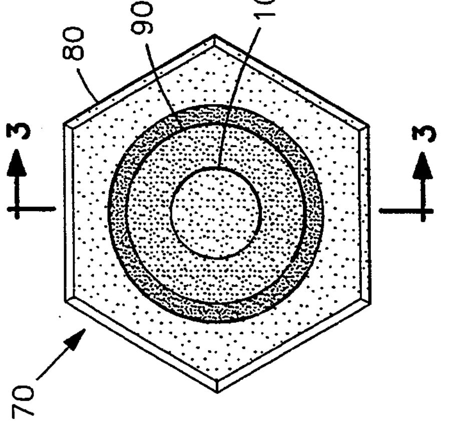
FIG. 2 is a top plan view of the invention, illustrating an indicator means bonded within a cavity of the invention.

FIGS. 1 and 3 show a device for indicating if the temperature of a fluid 150 within a machine 160 has surpassed a critical temperature. An integrally formed support means 70 of a rigid material able to withstand the critical temperature, such as a brass alloy or the like, includes a head 60 and a cavity 10 formed within the head 60. The head 60 provides a first engagement means 20 to enable a tool (not shown) to engage the head 60 in order to turn the device. The engagement means 20 is preferably formed from the wall 110 of the head 60, the head 60 being formed as a hexagonal nut 80 (FIG. 2). As such, a standard socket wrench or other wrench may be used to engage the device.

An engagement shaft 35 extends from the head 60 and provides a second engagement means 130 that enables engagement of the shaft 35 within an engagement aperture 131 in the machine 160. The shaft 35 further includes an axial bore 170 within the shaft 35 that extends from a distal end 180 of the shaft 35, through the shaft 35, and terminates adjacent to the cavity 10 within the head 60 (FIG. 3). Preferably, the second engagement means 130 is an external machine screw thread, and the engagement aperture 131 is a complimentary threaded hole, such as an oil pan drain hole. Further, the shaft 35 preferably includes at least two contiguous portions 30,40,50 formed consecutively therealong (FIG. 1). Each one of the portions 30,40,50 that is closer to the distal end 180 of the shaft 35 provides a lesser girth than each immediately previous portion 30,40. As such, the shaft 35 may be engaged with apertures 131 of various sizes. Each portion 30,40,50 is preferably separated by an annular groove 135 such that portions 30,40,50 of the shaft 35 which are not used may be more easily broken off of the shaft 35. Further, at least one compliant O-ring 140 is fitted annularly around the shaft 35 for sealing the support means 70 against the machine 160 when the shaft 35 is engaged within the aperture 131.

If desired, a plurality of commonly available tamper-evident sealing means may be used to indicate if the device has been disengaged from the machine 160 (not shown). For example, an adhesive bead may be applied to both the machine 160 and the device upon installation of the device in the machine 160. If the device is removed from the machine 160, the adhesive bead will break and thereby provide evidence that the device was removed from the machine 160. Clearly, if the device is installed in a commonly accessed engagement aperture 131 of the machine 160, such as the oil pan drain hole, application of such a tamper-evident sealing means may not be desirable.

A temperature indicator means 100 is made of a material having a melting temperature nearly equal to the critical temperature, which is preferably in the range of 250° F. to 265° F. Such a material may be any of several copper/aluminum alloys, antimony/bismuth alloys, or similar materials that have the desired melting temperature. The indicator means 100 is bonded within the cavity 10 such that the support means 70 and the indicator means 100 are in good thermal contact. A carrier member 90 may be included for holding the indicator means 100 to the head 60 (FIGS. 2 and 3). Such a carrier member 90 is manufactured from a material that is non-insulating and easily bonds to both the head 60 and the indicator means 100.

In use, the engagement shaft 35 of the device is engaged within the engagement aperture 131 of the machine 160 such that the fluid 150 is able to flow into and fill the axial bore 170 such that the temperature of the indicator means 100 is maintained at the temperature of the fluid 150. As such, if the fluid temperature exceeds the critical temperature, the indicator means 100 will melt, change shape, and then re-solidify upon cooling, thereby indicating to a person looking into the cavity that the fluid in the machine had surpassed at least the critical temperature.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A device for indicating if the temperature of a fluid within a machine has surpassed a critical temperature comprising:

an integrally formed supporting means of a material able to withstand the critical temperature including;

a head providing first engagement means to enable a tool to engage the head in order to turn same, and a cavity formed within the head;

an engagement shaft extending from the head, providing second engagement means, enabling engagement of the shaft within an engagement aperture in the machine, the shaft further including an axial bore within, extending from a distal end of the shaft, through the shaft, and terminating adjacent to the cavity within the head, the bore being separated from the cavity so that the fluid cannot move between the bore and the cavity;

a temperature indicator means of a material having a melting temperature equal to the critical temperature, the indicator means bonded within the cavity such that the support means and the indicator means are in good thermal contact, the indicator means not being in direct contact with the fluid;

wherein the fluid of the machine flows into and fills the axial bore such that the temperature of the indicator means is maintained at the temperature of the fluid without being in direct contact therewith, so that should the fluid exceed the critical temperature, the indicator means will melt, indicating that the fluid had reached the critical temperature.

2. The device for indicating if the temperature of a fluid within a machine has surpassed a critical temperature of claim 1 wherein the head is formed as an hexagonal nut, an hexagonal wall forming the first engagement means.

3. The device for indicating if the temperature of a fluid within a machine has surpassed a critical temperature of claim 1 wherein the second engagement means is an external machine screw thread, and the engagement aperture is a complimentary threaded hole.

4. The device for indicating if the temperature of a fluid within a machine has surpassed a critical temperature of claim 1 further including at least one compliant o-ring fitted annularly around the shaft for sealing the support means against the machine when the shaft is engaged within the aperture.

5. The device of claim 1 wherein the shaft includes at least two, linearly arranged, consecutive, contiguous portions, each of the portions being progressively smaller in girth from the head to the distal end of the engagement shaft, so that any one of the portions of the shaft may be engaged with the engagement aperture having a corresponding size.

6. The device of claim 5 wherein each one of the at least two portions is separated from the adjacent one of the portions by an annular groove for thinning the shaft such that at least one of the portions may be more easily broken off the shaft at the annular groove.

* * * * *